United States Patent
Murphy et al.

[11] Patent Number: 6,161,882
[45] Date of Patent: Dec. 19, 2000

[54] CLOSURE METHOD FOR DEVICES HAVING A STYLUS

[75] Inventors: Stephen C. Murphy, Payette; Hoyt A. Fleming, III, Boise, both of Id.

[73] Assignee: Micron Electronics, Inc., Boise, Id.

[21] Appl. No.: 09/098,125

[22] Filed: Jun. 16, 1998

[51] Int. Cl.[7] .................................................. E05C 19/00
[52] U.S. Cl. ........................................ 292/302; 292/300
[58] Field of Search .................................. 292/302, 300; 361/726, 683

[56] References Cited

U.S. PATENT DOCUMENTS

| | | |
|---|---|---|
| 1,659,822 | 2/1928 | Innes . |
| 2,194,763 | 3/1940 | Mayer . |
| 2,210,229 | 8/1940 | Boerner . |
| 3,933,381 | 1/1976 | Schurman . |
| 4,153,178 | 5/1979 | Weavers . |
| 4,844,519 | 7/1989 | Dagon . |
| 4,927,986 | 5/1990 | Daly . |
| 4,943,096 | 7/1990 | Looper . |
| 5,067,573 | 11/1991 | Uchida . |
| 5,200,913 | 4/1993 | Hawkins et al. . |
| 5,401,917 | 3/1995 | Yoshida et al. ............................ 178/18 |
| 5,422,442 | 6/1995 | Yoshida et al. . |
| 5,465,191 | 11/1995 | Nomura et al. .......................... 361/681 |
| 5,483,262 | 1/1996 | Izutani .................................... 345/179 |
| 5,555,157 | 9/1996 | Moller et al. ............................ 361/683 |
| 5,576,502 | 11/1996 | Fukushima et al. . |
| 5,576,929 | 11/1996 | Uchiyama et al. ....................... 361/680 |
| 5,622,395 | 4/1997 | Shine et al. . |
| 5,756,941 | 5/1998 | Snell . |
| 6,024,390 | 2/2000 | Murphy et al. .......................... 292/302 |

*Primary Examiner*—Lynn D. Feild
*Attorney, Agent, or Firm*—Knobbe, Martens, Olson & Bear, LLP

[57] ABSTRACT

A closure system useful for securing a device having a stylus. In a first embodiment, the closure system includes a housing having first and second housing members, the first housing member being configured to matingly contact the second housing member when the device is in a closed configuration. The stylus is received within a channel located in the second housing member. A latch release also located within the second member is controlled by the position of the stylus such that when the stylus is inserted within the channel, the latch release engages a latch located on the first member, thereby preventing the first and second members from separating. The latch release may also be used to block the latch such that the first and second housing members can not be mated when the stylus is removed from the channel. In another embodiment, a blocking device located within the second housing member and separate from the latch is utilized to prevent the device from being closed when the stylus is removed. Methods of securing the aforementioned housing and preventing the loss of the stylus are also disclosed.

13 Claims, 8 Drawing Sheets

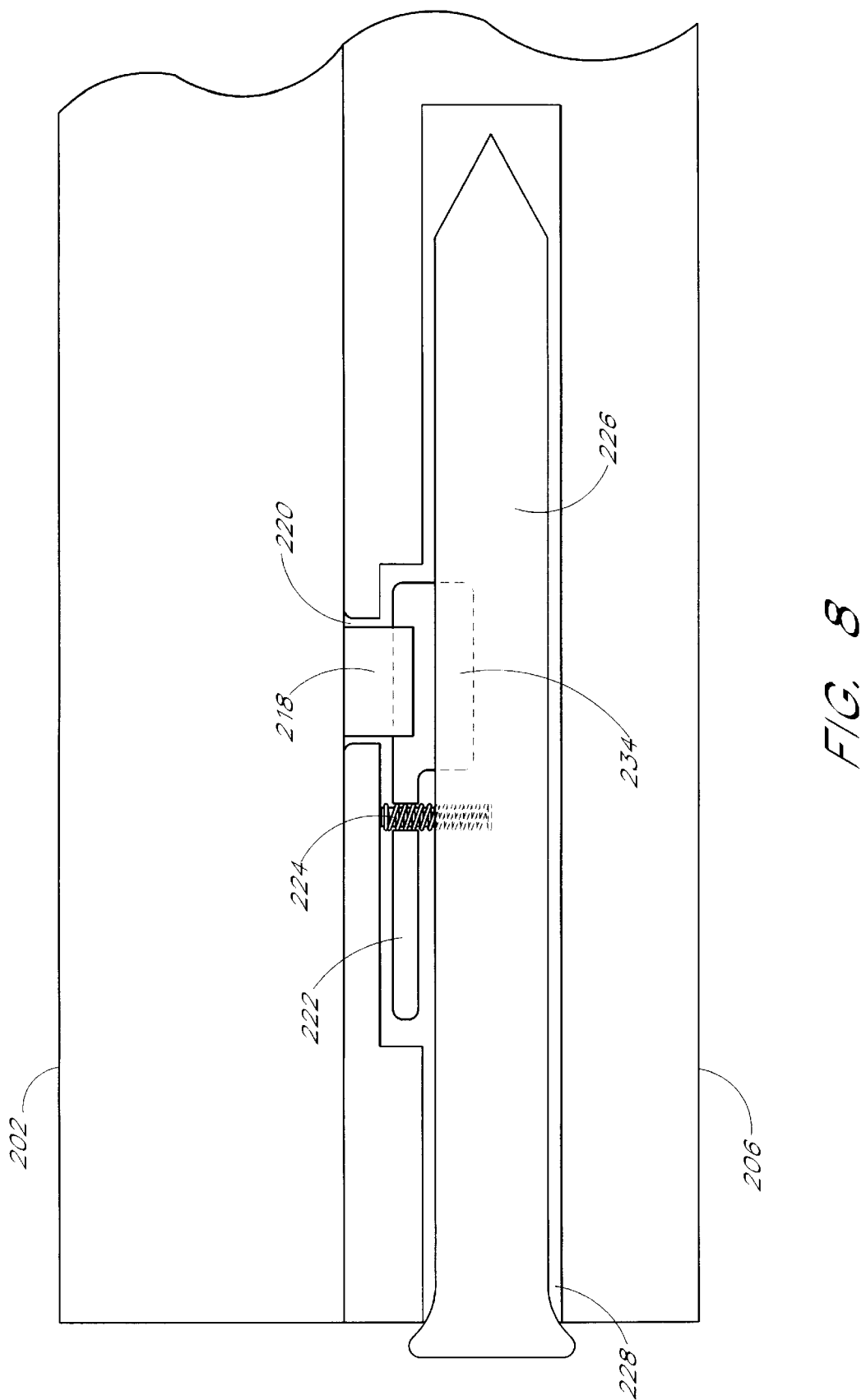

CLOSURE METHOD FOR DEVICES HAVING A STYLUS

RELATED APPLICATIONS

This application is related to a co-pending, commonly-owned U.S. Patent application Ser. No. 09/098,173, filed Jun. 16, 1998, entitled CLOSURE SYSTEM FOR DEVICES HAVING A STYLUS, and U.S. Patent application Ser. No. 09/100,376, filed Jun. 19, 1998, entitled SYSTEM AND METHOD FOR INDICATING WHEN A STYLUS OF A COMPUTER IS MISSING.

BACKGROUND OF THE INVENTION

1. Field of the Invention

The invention relates to computers and, more particularly, to a method and system for preventing the closure of a housing of a computer if a stylus of the computer is not secured within a receiver of the computer so as to prevent the loss of the stylus.

2. Description of the Related Technology

Many types of electronic devices such as calculators, personal planners, portable, handheld, or "palm-top," computers, for example, which are manufactured today, often use a stylus, otherwise known as a touch pen, in conjunction with a touch sensitive screen, to implement computer operations. For convenience, such devices will be referred to generically herein as "computers." With these computers, a user may select icons displayed on the touch-sensitive screen, for example, by touching the screen at appropriate locations with the stylus. The stylus is typically contained and held within a sleeve, channel, or other type of receiver, which is typically located within the housing of the computer. After a user has finished using the stylus, he or she can then insert the stylus into the sleeve for safekeeping and turn the computer off.

Unfortunately, as human beings sometimes tend to be forgetful, or become preoccupied or distracted during use of a computer, the stylus of prior art computers often becomes lost, or misplaced. Therefore, what is needed is a method and system for preventing the loss of a stylus of an electronic device such as a computer.

SUMMARY OF THE INVENTION

The invention addresses the above and other needs by providing a method and system for not allowing a computer to shut properly when a stylus of the computer is not seated properly in its holder.

In one embodiment of the invention, a method of closing a device having a stylus, includes: ositioning a first member of the device with respect to a second member of the device so as to place the first and second members in a closed configuration; receiving a stylus within a stylus channel coupled to the second member; and engaging a latch, coupled to the first member, with the stylus as the stylus is inserted into the stylus channel, thereby securing the first and second members in the closed configuration.

In another embodiment, a method of closing a device having a stylus, the device including a first member and a second member, coupled to the first member, includes preventing the first member from closing with respect to the second member when the stylus is not positioned within a stylus channel of the device.

BRIEF DESCRIPTION OF THE DRAWINGS

FIG. 8 is an elevational, cross-sectional view of the computer of FIG. 4, taken along line 8—8 of that figure, showing the position of the blocking member of the computer when the computer is in a closed position, and when the stylus is received within the stylus channel in accordance with one embodiment of the invention.

DETAILED DESCRIPTION OF THE INVENTION

The invention is described in detail below with reference to the figures, wherein like elements are referenced with like numerals throughout.

Figure 1:
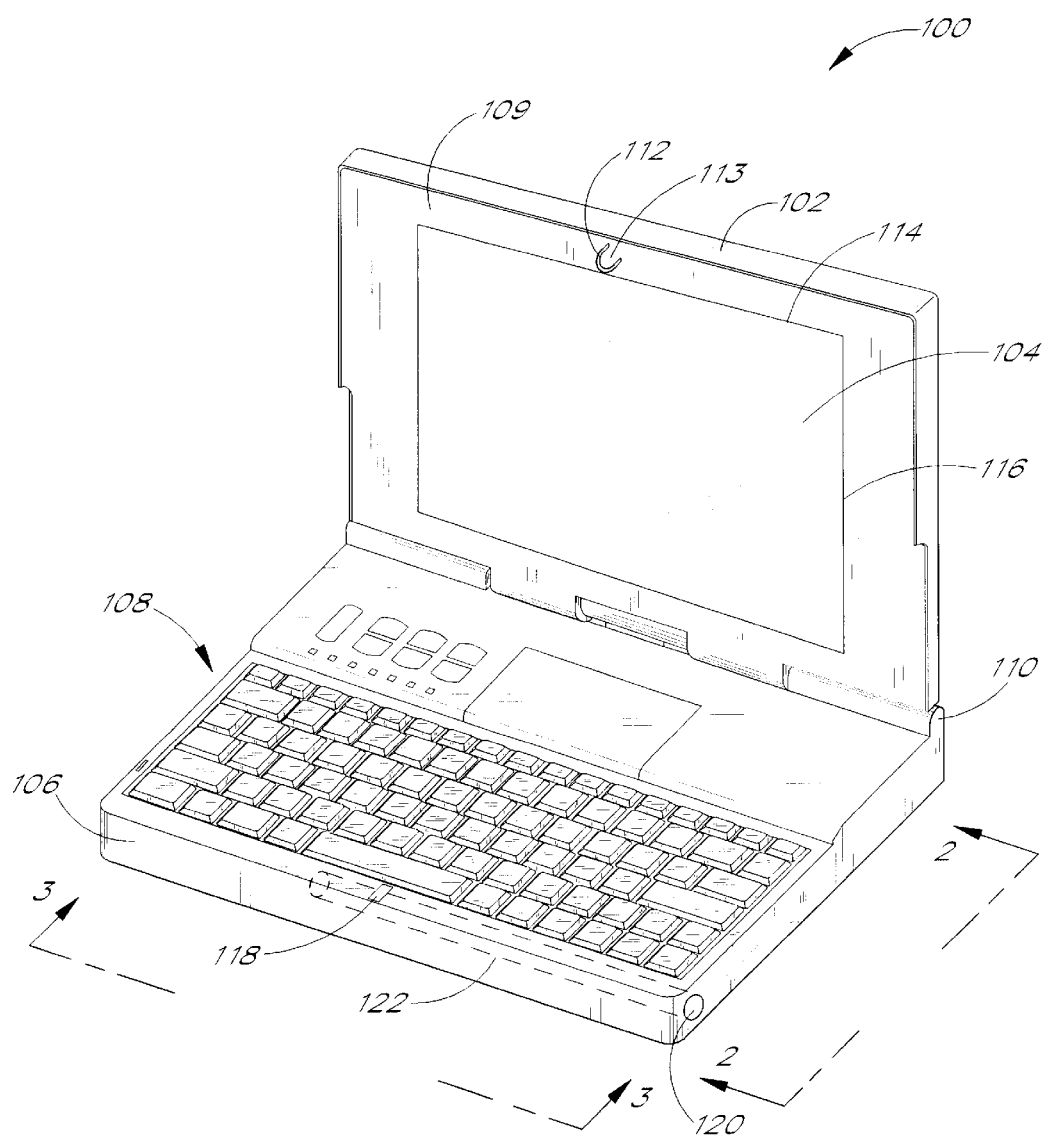
FIG. 1 is a perspective view of a computer having a stylus, a channel for receiving the stylus therein, and a touch-sensitive screen, in accordance with one embodiment of the invention.

Referring to FIG. 1, a perspective view of a computer 100, designed in accordance with one embodiment of the invention, is illustrated. The computer 100 includes a first member or top 102 which provides a display screen 104 for displaying text, images, and graphical user interface (GUI) data to the operator of the computer 100. The computer 100 further includes a second member or base 106 that provides an alphanumeric keyboard 108 for receiving input from an operator of the computer 100. The first member 102 is coupled to the second member 106 by a hinge 110 that allows the first member 102 to swing away from the second member 106 when the computer is "opened" for use by an operator, and allows the first member 102 to swing toward the second member 106 so as to "close" the computer 100 when it is shut off and not being used by an operator. In one embodiment, the hinge 110 is spring-biased such that the first member 102 automatically swings away from the second member 106 when the first member 102 is not properly latched shut to the second member 106.

To latch the first member 102 shut with respect to the second member 106, the computer 100 includes a latch 112 attached to the first member 102 so as to extend outwardly from a front surface 109 of the first member 102 on which the display screen 104 is provided. As shown in FIG. 1, the latch 112 is located above a top edge 114 of the display screen 104 at a substantially central position between the two side edges 116 of the display screen 104. When the first member 102 is in a closed position with respect to the second member 106, the latch 112 passes through a latch aperture 118, which is located on the second member 106 so as to matingly receive the latch 112 therethrough. As will be described in further detail below with respect to FIG. 3, in this closed position, a stylus 120 which is received within a stylus channel, or receiver, 122, passes through a hole 113 of the latch 112 so as to prevent the first member 102 from swinging away from the second member 106, thereby latching the computer 100 in a closed position. Although the latch 112 is illustrated as an eyelet surrounding the hole 113, the latch 112 may also be configured in other shapes, such as that of a hook, for example.

Figure 2A:
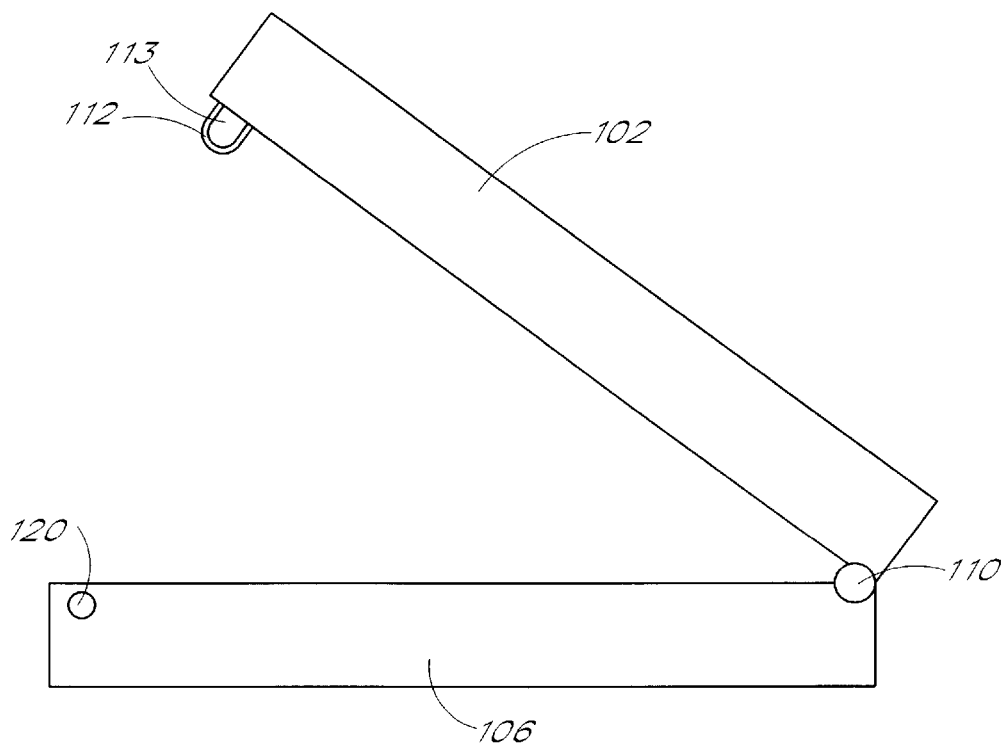
FIG. 2A is an elevational side-view of a computer, taken along lines 2—2 of FIG. 1, when the computer is in an open position.

FIG. 2A is an elevational side view of the computer 100 of FIG. 1, taken along line 2—2 of FIG. 1, when the computer 100 is in the open position. In this position, the first member 102 is rotated away from the second member 106. The first and second members 102 and 106, respectively, rotate about the hinge 110. As shown in FIG. 2A, an end portion of a stylus 120, which is received within a stylus channel 122 (FIG. 1) of the computer 100, extends outwardly from a side surface of the second member 106.

Figure 2B:
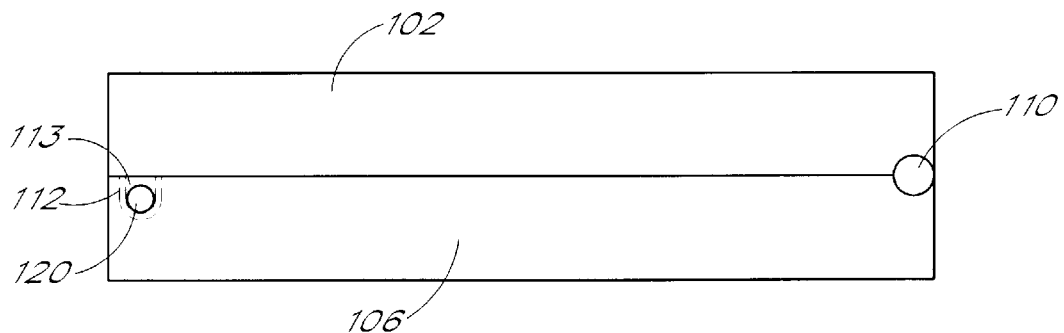
FIG. 2B is an elevational side-view of a computer, taken along lines 2—2 of FIG. 1, when the computer is in a closed position.

FIG. 2B is an elevational side view of the computer 100 of FIG. 1, taken along line 2—2 in FIG. 1, when the computer 100 is in the closed position. In this position, the first member 102 is rotated about the hinge 110 toward the second member 106 such that the first member 102 and the second member 106 come together to enclose the computer 100. When the computer is in this closed position, the latch 112 passes through the latch aperture 118 and transversely extends across the stylus channel 122 such that the hole 113 of the latch 112 is horizontally aligned with the stylus channel 122. After the computer 100 is in the closed position, the stylus 120 may be inserted into the stylus channel 122. As the stylus 120 is being inserted into the stylus channel 122, it passes through the hole 113 of the latch 112, thereby acting as a bolt or pin which secures the latch 112 against retracting outwardly from the latch aperture 118. Since the first member 102 is attached to the latch 112, the first member 102 is prevented from swinging away from the second member 106. In this way, the computer 100 is latched closed.

Figure 3:
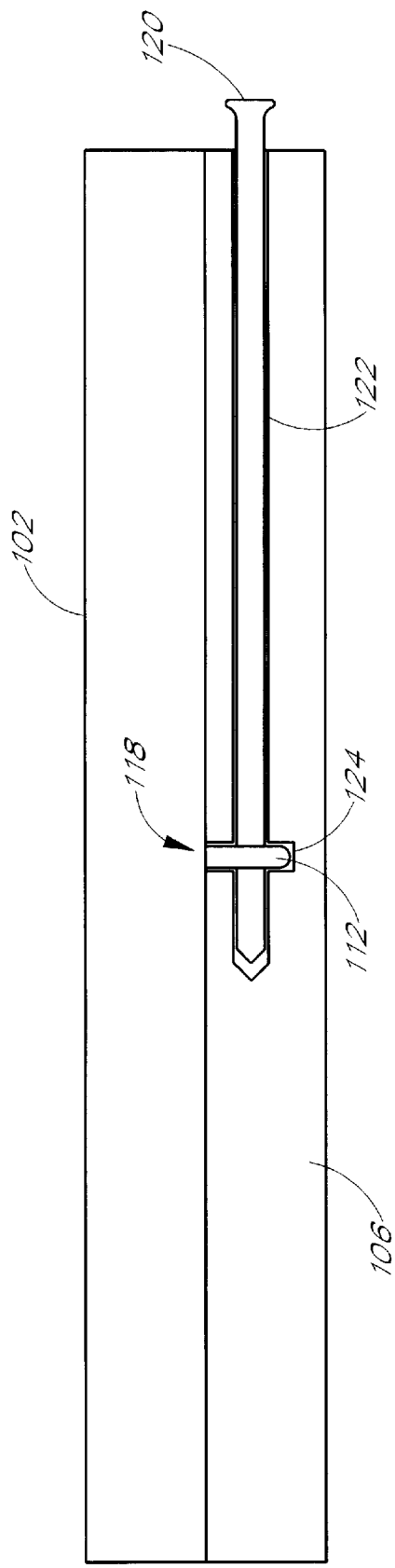
FIG. 3 is a cross-sectional view of the computer of FIG. 1, taken along line 3—3 of FIG. 1 at approximately a longitudinal bi-section of a stylus channel of the computer.

Referring to FIG. 3, when the computer 100 is in the closed position, the latch 112 passes through the latch aperture 118 and transversely extends across the stylus channel 122. The latch 112 is seated within a recess 124 located within the second member 106 and which extends downwardly from a bottom perimeter of the channel 122, such that the hole 113 (FIGS. 2A and 2B) of the latch 112 is aligned with the longitudinal axis of the stylus channel 122. The recess 124 is configured to provide clearance for the latch so as to allow a peripheral portion of the latch 112 to extend beyond the cylindrical boundaries of the stylus channel 122, thereby allowing the hole 113 of the latch 112 to be aligned with the longitudinal axis of the channel 122 such that when the stylus 120 is inserted into the channel 122, it passes through the hole 113 of the latch 112.

Note that because the first member is biased in the open position, the computer will not stay closed without insertion of the stylus. This reminds the user to insert the stylus 120 into the stylus channel 122 after each use of the computer 100. By requiring the stylus 120 to be inserted into the stylus channel 122 to secure the computer 100 in a closed position, the likelihood that a user of the computer 100 will inadvertently lose the stylus, or leave it behind after he or she has finished using it, is significantly reduced. The user is reminded after every session with the computer 100 to place the stylus 120 into the stylus channel 122. Otherwise, the first member 102 will not be able to be secured shut with respect to the second member 106. In this way, the method and system of the invention provides a safeguard against losing the stylus 120.

As shown in FIG. 3, the stylus channel 122 extends within the body of the second member 106 at a location behind a front surface of the second member 106 and in an orientation that is parallel to that front surface. However, the channel 122 need not be located and oriented in this position. Depending on the size and shape of the computer 100, the stylus channel 122 may be located on the first member 102, for example, or run in a direction perpendicular to the plane of the sheet of paper upon which FIG. 3 is printed. The location, and orientation, of the stylus channel 122, and a corresponding position of the latch 112, may be implemented in any desired configuration allowed by the size, shape and space available within the computer 100.

Figure 4:
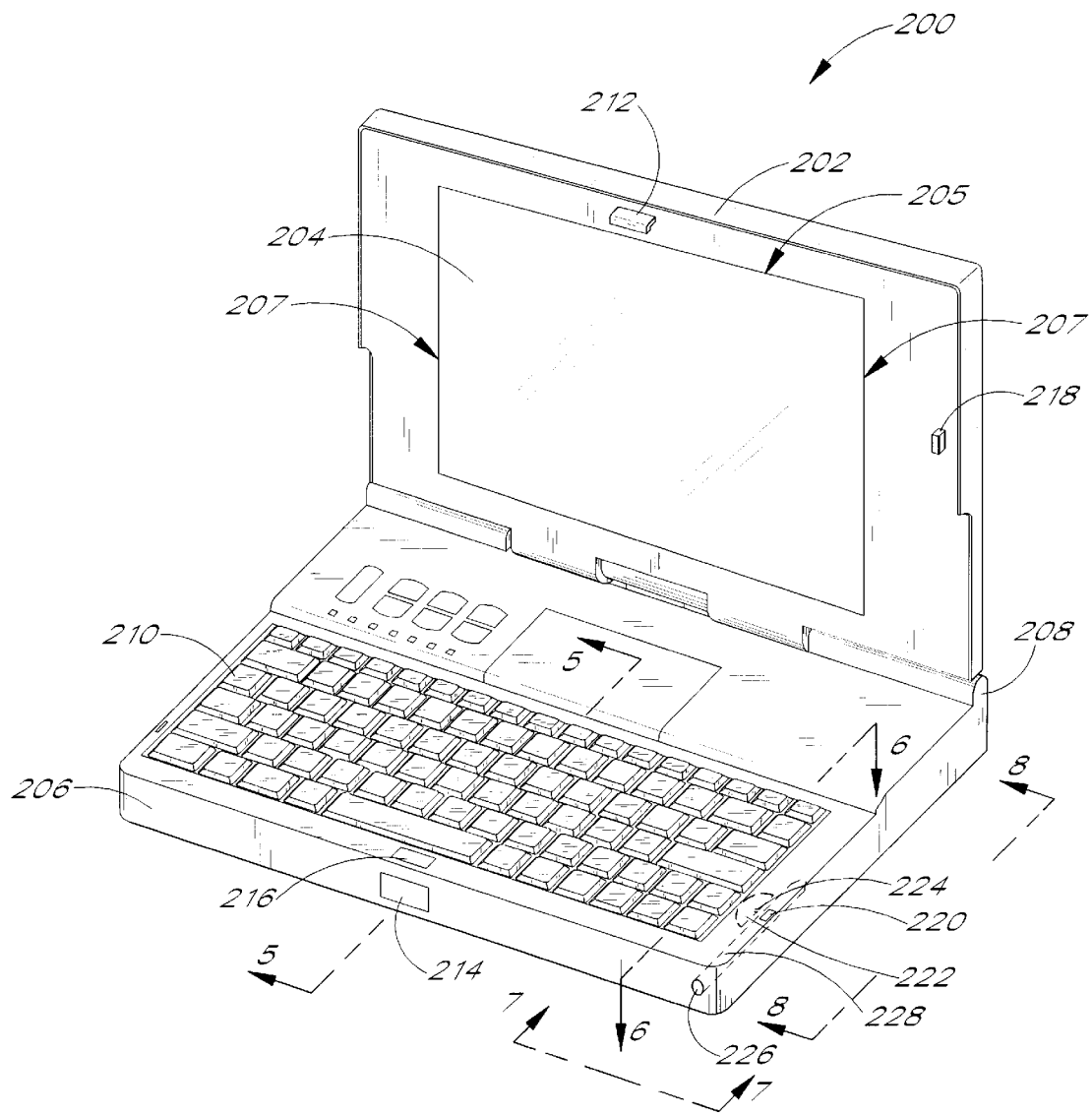
FIG. 4 is a perspective view of a computer having a stylus, a channel for receiving the stylus therein, and a touch-sensitive screen, in accordance with another embodiment of the invention.

FIG. 4 is a perspective view of a computer 200, in accordance with another embodiment of the invention. The computer 200 includes a first member 202 which provides a display screen 204 for displaying text and other types of graphical information/images, and second member 206 which is rotatably coupled to the second member 206 by a hinge 208. The second member 206 provides an alphanumeric keyboard 210 for receiving user inputs.

To latch the first member 202 shut with respect to the second member 206, the computer 200 includes a latch 212, attached to the first member 202 so as to extend outwardly from a front surface of the first member 202 on which the display screen 204 is provided. As shown in FIG. 4 the latch 212 is located above a top edge 205 of the display screen at a substantially central position between the two side edges 207 of the display screen 204. When the first member 202 is in a closed position with respect to the second member 206, the latch 212 passes through a latch aperture 216, which is provided on the second member 206 at a position which is in mating alignment with the latch 212 when the first member 202 is in the closed position with respect to the second member 206. As will be described in further detail below with respect to FIG. 5, in this closed position, the latch 212 interlocks with the latch release 214 to secure the computer 200 in a closed position.

The computer 200 further includes a stop member 218 attached to the front surface of the first member 202 and extending outwardly therefrom. In one embodiment the stop member 218 is configured in the shape of a peg which extends outwardly from the front surface of the first member 202 as shown in FIG. 4. When the computer 200 is in the closed position, the stop member 218 is inserted into an aperture 220 which is configured to receive the stop member 218. A blocking member 222, configured in the shape of a half circular disk, is located within the housing of the second member 206 at a location adjacent to the aperture 220. The blocking member 222 rotates about a pin 224 which serves as an axis of rotation for the blocking member 222. The pin 224 is attached at one end to an internal wall of the second member and is spring biased to cause the blocking member 222 to swing clockwise in order to obstruct the aperture 224 when a stylus 226 is not positioned within a stylus channel 228 located in the second member 206. The structure and operation of the blocking member 222 is discussed in greater detail below with respect to FIGS. 6A, 6B, and 7.

In FIG. 4, the stylus 226 is shown positioned within the stylus channel 228. Upon inserting the stylus 226 into the stylus channel 228, the stylus 226 contacts and pushes a portion of the blocking member 222 so as to rotate it counter-clockwise away from the aperture 220. Therefore, when the stylus 226 is in the stylus channel 228, the aperture 220 is not obstructed by the blocking member 222. As explained in further detail below with respect to FIGS. 5, 6A and 6B, in order to latch the computer 200 closed, the aperture 220 must not be obstructed by the blocking member 222.

Figure 5:
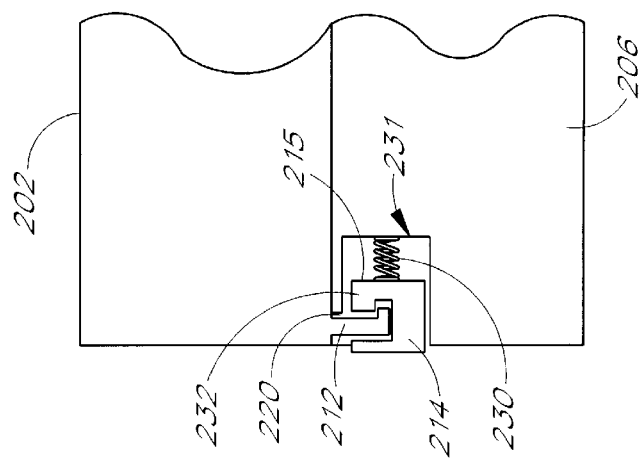
FIG. 5 is an elevational, cross-sectional view of the computer of FIG. 4, taken along lines 5—5 of FIG. 4.

Referring to FIG. 5, a cross-sectional view of the computer 200 of FIG. 4, taken along line 5—5 of FIG. 4, when the computer 200 is in a closed position is illustrated. In this closed position, the latch 212 extends through the latch aperture 216 and engages the latch release 214 which is configured to receive and hold the latch 212. The latch release 214 is spring biased by a spring 230 which is positioned between a rear wall 215 of the latch release 214 and an internal support wall 231 of the second member 206. The spring 230 biases the latch release 214 outwardly, to the left as shown in FIG. 5. Therefore, a hook portion 232 of the latch release interlocks with the latch 212, thereby preventing the latch 212 from moving out of the latch aperture 220.

In the embodiment of FIG. 4, the first member 202 is spring-biased by means of the hinge 208 to move away from the second member 206 when the latch 212 is not interlocked with the latch release 214. The latch 212 may be released from the latch release 214 by pressing the latch release 214 inwardly, toward the right as shown in FIG. 5. This compresses the spring 230 and disengages the hook portion 232 of the latch release 214 from the latch 212. When the latch 212 is released, the first member 202 automatically swings upwardly and away from the second member 206 because of the spring-biased hinge 208.

Figure 6B:
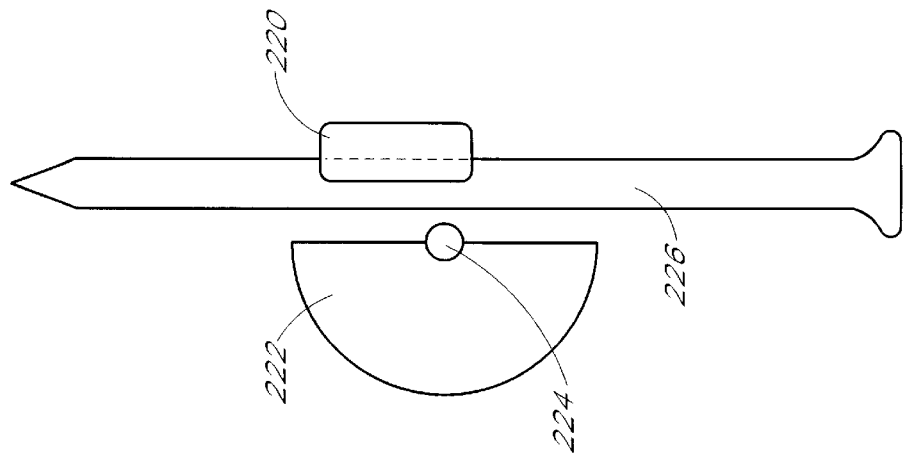
FIG. 6B is a top plan view of the aperture and blocking member of FIG. 6A, as configured when a stylus is inserted into the stylus channel of the computer.
Figure 6A:
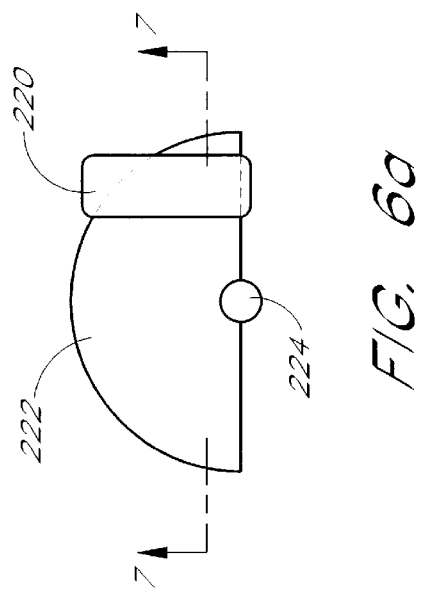
FIG. 6A is a top plan view of an aperture and blocking member of the computer of FIG. 4 as configured when a stylus is not present within a stylus channel of the computer.

Referring to FIG. 6A, a top view of the blocking member 222 and the aperture 220, when the stylus 226 is not received within the stylus channel 228, is illustrated. When the stylus 226 is not inserted into the stylus channel 228, the blocking member 222 is biased to rotate so that it is positioned to obstruct the aperture 220 so as to prevent the stop member 218 (FIG. 4) from passing through the aperture 220. When a user attempts to close the computer in this state, he or she will find that the stop member 218 comes into contact with the blocking member 222 before the first member 202 can be fully closed with respect to the second member 206. Since the first member 202 can not be fully closed with respect to the second member 206, the latch 212, attached to the first member 202, will not be able to engage the latch release 214. If the first member 202 is spring biased to rotate away from the second member 206 by means of a springbiased hinge 208, as described above, the first member 202 will automatically swing open, away from the second member 206.

Referring to FIG. 6B, the same view as shown in FIG. 6A is illustrated, except a stylus 226 is positioned within the stylus channel 228 (FIG. 4). The blocking member 222 is thereby rotated counter-clockwise about the pin 224 and no longer obstructs the aperture 220. Although the stylus 226 is located beneath the aperture 220, it is positioned far enough below the aperture 220 so as to provide adequate room for the stop member 218 to fully enter the aperture 220. Therefore, when the stylus 226 is inserted into the stylus channel 228, the first member 202 may be shut closed with respect to the second member 206. This allows the latch 212 to engage the latch release 214 so as to secure the computer 200 in a closed position.

Figure 7:
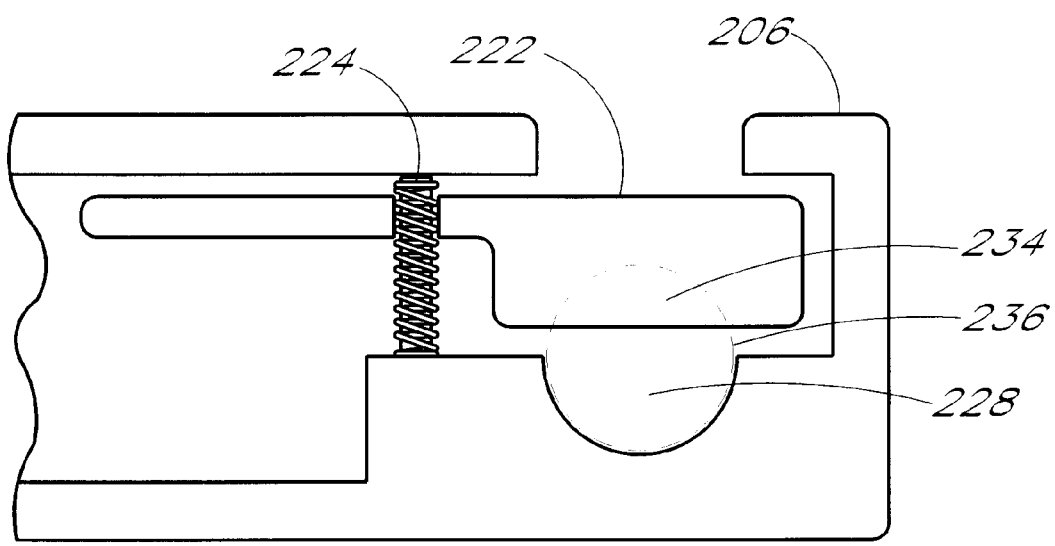
FIG. 7 is an elevational, cross-sectional view of the computer of FIG. 4, taken along line 7—7 of that figure at a cross-section adjacent the location of the blocking member in the computer.

FIG. 7 is an elevational cross-sectional view of a portion of the computer 200, taken along line 7—7 of FIG. 4. As shown in FIG. 7, the blocking member 222 includes a bottom portion 234 which engages the stylus 226 (FIG. 6B) when it is inserted into the stylus channel 228. A cylindrical boundary of the stylus channel 228 is represented by dashed lines 228 in FIG. 7. As the stylus 226 is inserted into the channel 228 it engages the bottom portion 234 of the blocking member 222, causing the blocking member 222 to rotate counter-clockwise about the axis pin 224. When the stylus 226 is fully inserted into the stylus channel 228, the blocking member 222 is rotated counterclockwise by approximately ninety (90) degrees and no longer obstructs any portion of the aperture 220. When positioned within the stylus channel 228, the stylus 226 is located far enough below the opening of the aperture 220 such that there is ample room for the stop member 218 to be received through the aperture 220.

FIG. 8 is an elevational cross-sectional view of the computer 200, taken along line 8—8 of FIG. 4, when the computer 200 is in the closed position. In this closed position, the stylus 226 is positioned within the stylus channel 228 and engages a lower portion 234 of the blocking member 222 such that the blocking member 222 is rotated counter-clockwise approximately (90) ninety degrees about the axis pin 224. When the blocking member 222 is rotated, the aperture 220 is unobstructed and receives the stop member 218 therethrough, thereby allowing the first member 202 to close flush with respect to the second member 206.

Figure 9A:
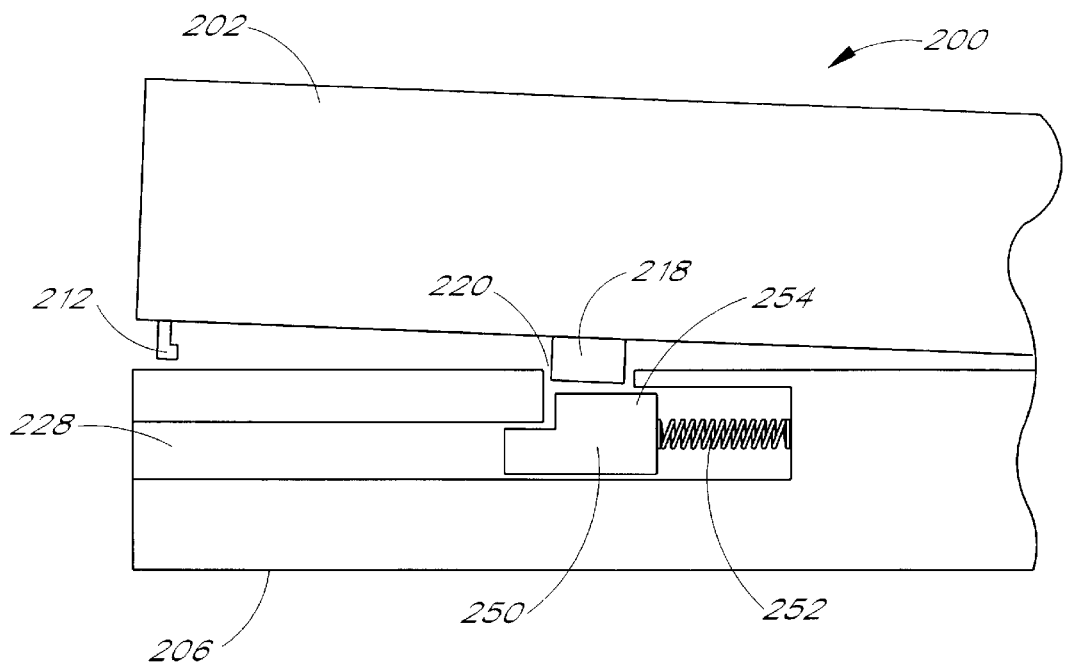
FIG. 9A is an elevational, cross-sectional view of the computer of FIG. 4 taken along line 8—8 of that figure, but illustrating another embodiment of a blocking member which is positioned adjacent an aperture so as to block a stop member from being received within the aperture.

Although the blocking member 222 has been described above as a spring-biased, half circular disk, the blocking member 222 may be configured in other ways so as to provide the function of obstructing the aperture 220 when the stylus 226 is not positioned within the stylus channel 228. For example, as shown in FIG. 9A, a blocking member 250 may be configured in the shape of an L-shaped block. When a stylus (not shown) is not positioned within the stylus channel 228, the blocking member 250 is biased toward the opening of the stylus channel 228 by a biasing spring 252 which pushes the blocking member 250 outwardly toward the opening of the stylus channel 228. In this position, a top portion 254 of the blocking member 250 is positioned beneath the aperture 220 so as to block the aperture 220. When a user attempts to close the first member 202 with respect to the second member 206, the stop member 218 is prevented from entering the aperture 220 by the top portion 254 of the blocking member 250. Therefore, the user will not be able to close the computer 200.

Figure 9B:
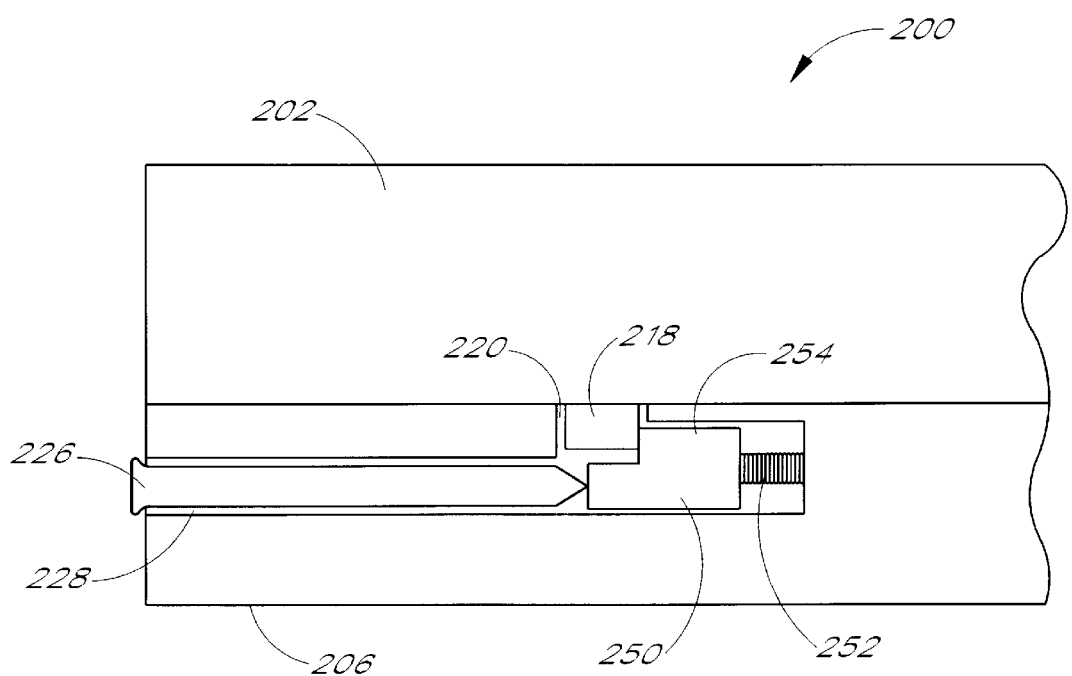
FIG. 9B is an elevational, cross-sectional view of the computer illustrated in FIG. 9A, showing the relative positions of the blocking member, the stop member and a stylus received within a stylus channel, when the computer is in a closed position.

Referring to FIG. 9B, when a stylus 226 is inserted into the stylus channel 228, the stylus 226 pushes the blocking member 250 inwardly, toward the right and thereby latches the blocking member 250 in its retracted position. A latch mechanism for latching the blocking member 250 is described in further detail below. In this position, the top portion 254 of the blocking member 250 no longer obstructs the aperture 220 and the stop member 218 is allowed to pass through the aperture 220. As described above, the blocking member 250 is spring biased to push the stylus 226 outwardly to the left by biasing spring 252. However, as described in further detail below, the blocking member 250 can be configured to be latched when it is pushed inwardly by a certain distance so as to resist the outward tensile force generated by the biasing spring 252. To release the blocking member 250 from its retracted position, a user may press the end of the stylus 226 inwardly so as to unlatch the blocking member 250 from its retracted position. After the blocking member 250 is unlatched, the biasing spring 252 pushes the blocking member 250 and the stylus 226 outwardly. The stylus 226 may then be pulled out of the stylus channel 228 and used by the operator. The latch mechanism employed for latching the blocking member 250 in its retracted position, and releasing the blocking member 250 from the retracted position, may be any one of numerous mechanisms which are found in commercially available pens, for example.

As any one who has written with a pen can appreciate, by pressing a button located at one end of a pen, a writing tip may be caused to extend outwardly from the opposite end of the pen. A latch mechanism holds the writing tip of the pen against a tensile force produced by a biasing spring within the pen, thus allowing a user to write/draw using the writing tip of the pen. To release the pen tip from this outward position, the user need only press down on the button a second time, to disengage the latch mechanism which holds the pen tip outwardly, thereby retracting the writing tip into the body of the pen. The blocking member 250 may be spring-biased and configured with any well-known latch mechanism, such as that described above with respect to writing pens, for example, in accordance with one embodiment of the invention.

It is contemplated within the scope of the invention that many different configurations of a stylus-actuated blocking member may be implemented. For example, a blocking member may be spring-biased to transversely enter a stylus channel from a direction that is substantially perpendicular to a longitudinal axis of the channel so as to be positioned to at least partially obstruct an aperture for receiving a stop member. When the stylus is inserted into the stylus channel, the stylus may engage an angled portion of the blocking member so as to push the blocking member sideways and out of the stylus channel. When the blocking member is not positioned within the channel, the blocking member no longer obstructs the aperture. Furthermore, since the blocking member is spring-biased to move into the stylus channel, the blocking member will exert force on a side of the stylus, thereby helping to secure the stylus within the stylus channel. The above-described configuration is only one of many different configurations contemplated by the invention.

As described above with respect to FIGS. 4–9, when the stylus 226 is not inserted and received by the stylus channel 228, the computer 200 will not close properly. Therefore, a user who attempts to close the computer 200 without the stylus 226 properly seated in the stylus channel 228 will discover that the stylus 226 is missing from its holder. In this way, the user is reminded to replace the stylus 226 into the stylus channel 228 after each use of the stylus 226. It is contemplated that this reminder will impart upon the user the importance of properly placing the stylus 226 back into the stylus channel 228 after each use, thereby significantly reducing the possibility that the stylus 226 will become lost due to inadvertent misplacement.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A method of closing a device having a stylus, comprising:
    positioning a first housing member of the device with respect to a second housing member of the device so as to place the first and second housing members in a closed configuration;
    receiving a stylus within a stylus channel coupled to the second housing member; and
    engaging a latch, coupled to the first housing member, with the stylus as the stylus is inserted into the stylus channel, thereby securing the first and second housing members in the closed configuration.

2. The method of claim 1 further comprising biasing the first housing member to be in an open position with respect to the second housing member, when the stylus is not received within the stylus channel.

3. A method of closing a device having a stylus, the device including a first housing member and a second housing member, coupled to the first housing member, the method comprising preventing the first housing member from closing with respect to the second housing member when the stylus is not positioned within a stylus channel of the device.

4. The method of claim 3 wherein said act of preventing the first housing member from closing with respect to the second housing member comprises biasing a blocking member, coupled to the second housing member, to be positioned to obstruct an aperture located on the second housing member so as to prevent a stop member, coupled to said first housing member, from extending through the aperture.

5. The method of claim 4 further comprising allowing said first housing member to be secured in a closed position with respect to said second housing member, only when said stylus is positioned within said channel.

6. The system of claim 5 wherein said act of securing comprises engaging a latch, coupled to said first housing member, with a latch release, coupled to said second housing member.

7. The method of claim 6 further comprising biasing said first housing member to be in an open position with respect to said second housing member when said stylus is not positioned within said channel.

8. A method of notifying a user of the removal of a stylus from a stylus receiver of an electronic device, comprising:
    movably attaching a first device housing member having a latch to a second device housing member, the second device housing member having a stylus receiver disposed at least partly therein;
    inserting the stylus into the stylus receiver, the stylus engaging the latch so as to maintain the electronic device in a closed configuration;
    biasing the first device housing member with respect to the second device housing member so as to urge the first and second device housing members into an open configuration when the latch is not engaged by the stylus;
    removing at least a portion of the stylus from the receiver; and
    in the response to the act of removing, allowing said first and second device housing members to be urged into the open configuration, thereby notifying the user that the stylus has been removed.

9. The method of claim 8, wherein the act of movably hingedly attaching comprises attaching the first and second device housing members such that the first device housing member may rotate around an axis with respect to the second device housing member.

10. A method of preventing an electronic device having a stylus from being secured in a closed configuration, comprising:

rotating a first device housing member, having a stop element disposed thereon, with respect to a second device housing member having a corresponding stop element aperture and a stylus receiver formed therein, the act of rotating causing at least a portion of the stop element to be removed from the stop element aperture and placing the first and second device housing elements in an open configuration;

detecting when the stylus is removed from the stylus receiver; and selectively blocking at least a portion of the aperture only when the stylus is removed from the stylus receiver, thereby preventing the stop element from being fully received within the stop element aperture, and the first and second device housing elements from being placed in the closed configuration.

11. The method of claim 10, wherein the act of detecting comprises biasing a blocking member against the stylus when the stylus is received within the stylus receiver such that the position of the blocking member is altered when the stylus is removed from the stylus receiver.

12. The method of claim 11, wherein the act of selectively blocking comprises rotating the blocking member around an axis when the stylus is removed from the stylus receiver.

13. The method of claim 10, wherein the act of rotating comprises biasing the first device housing member with respect to the second device housing around a common axis.

* * * * *